Patented Mar. 25, 1952

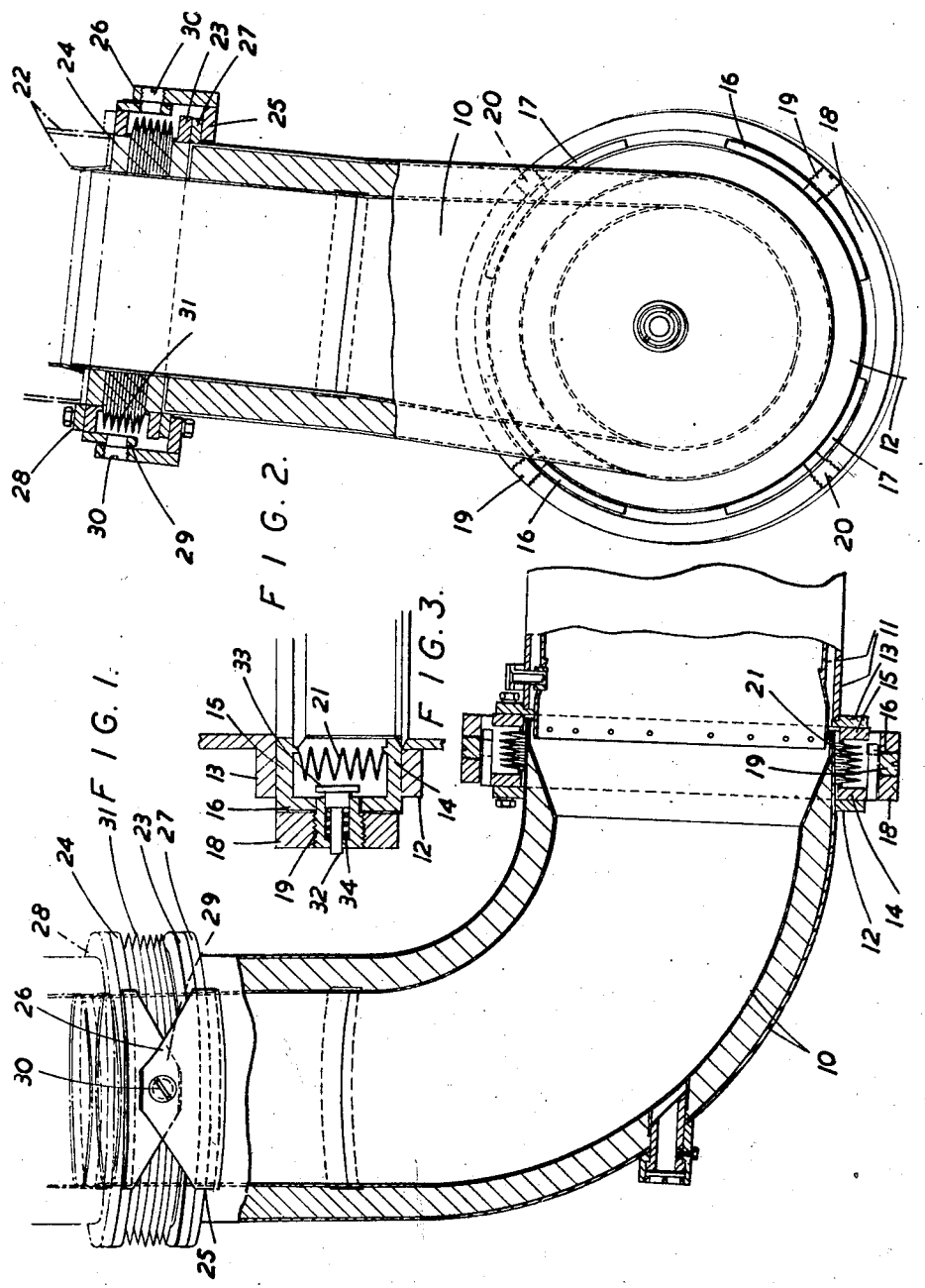

2,590,392

UNITED STATES PATENT OFFICE 2,590,392

FLEXIBLE JOINT FOR PIPES CARRYING INTERNAL FLUID PRESSURE

Geoffrey Bertram Robert Feilden, Lincoln, England, assignor to Ruston & Hornsby Limited, Lincoln, England, a British company Application April 26, 1950, Serial No. 158,232
In Great Britain April 29, 1949

2 Claims. (Cl. 285—90)

This invention relates to flexible-joints for pipes carrying internal fluid pressure, which tends to separate the joined pipe-ends and calls for the provision of means for transmitting tension betweeen the joined pipe-ends. In some cases shear loads may also have to be transmitted.

It is usual in current practice to make such a joint by means of a flexible bellows or like device which will retain the internal fluid and resist its outward pressure, but cannot resist axial tension or transverse shear. Resistance to tension is often provided by a pair of external tie rods situated at opposite ends of a diameter of the joint. This arrangement affords no resistance to shear loads; and the joint is only flexible in one plane containing the axis of the joint owing to the constraint imposed by the tie rods; and if universal flexibility is required two such joints must be employed, the tie rods of which are respectively in mutually perpendicular axial planes.

The main object of the invention is to overcome these disadvantages and the object is achieved by combining a flexible bellows or like fluid-tight connection having little tensile or shear strength with an external articular structure composed of rigid elements and rigidly connected to the pipe-ends. If the joint is required to be universally flexible the articular structure is constituted by a gimbal assembly.

The articular structure connecting the pipe-ends not only transmits tension between them, but also transmits shear-loads from one pipe to the other, thus relieving the bellows of all shear-loading.

A further object of the invention is the substantial suppression of resonant oscillations of the flexible bellows. This is accomplished by including within the trunnion pivot pins of spring-loaded damping plungers having enlarged ends which bear upon the outside of the corrugations of the flexible bellows or like connecting means. By this means resonant vibrations of the bellows, which might lead to fatigue failures, are prevented from developing an appreciable amplitude by frictional damping or by detuning the combined system consisting of bellows and spring-loaded plungers.

The accompanying drawings illustrate a specific embodiment of the invention by way of example and the following description of the drawings is without implied limitation of the scope of the invention as defined in the appended claims. In the drawings, Figure 1 is a view in elevation, partly in axial section, of an elbow pipe and two flexible joints;

Figure 2 is an end elevation of the same partly in axial section;

Figure 3 is a detail view in axial section on an enlarged scale illustrating a modification.

Referring to the drawing an elbow pipe 10, of double-skin construction with an intervening layer of lagging is connected to a tubular element 11 by a universal flexible joint allowing relative angular movement of parts 10, 11, within limits, in two planes at right angles. The pipe 10 is flanged at 12, and the tubular element 11 is similarly flanged at 13. To flanges 12, 13 are respectively secured rings 14, 15 having axially extending lugs 16, 17. Lugs 16 extend from ring 14 towards tube 11 and lugs 17 extend from ring 15 towards pipe 10. A gimbal ring 18 is connected by a pair of coaxial trunnion pins 19 to lugs 16 and by a similar pair of coaxial trunnion pins 20 to lugs 17, the axis of pins 19 intersecting the axis of pins 20 at right angles at the axis of the pipe 10. A flexible bellows 31, disposed within the gimbal ring 18, is secured to the rings 14, 15 and renders the joint fluid-tight. The gimbal ring structure 14—20 transmits all loads, both tensile and shear from pipe 10 to tube 11 and conversely and relieves the bellows 31 of all such loading.

The other end of the pipe 10 is connected by a flexible joint having only one degree of angular freedom to a tubular member 22. The pipe 10 is flanged at 23 and member 22 is likewise flanged at 24. To flange 23 are secured two brackets 25, 26 each comprising a ring segment 25 and a lug 26 extending axially towards the member 22. A distance ring 27 is inserted between the segments 25 and the flange 23. To the flange 24 is secured a ring 28 having two lugs 29 extending towards pipe 10 and overlapping lugs 26. Each lug 26 is connected to the corresponding lug 29 by a trunnion pin 30 the two trunnion pins 30 having a common axis intersecting the axis of pipe 10. As in the joint between pipe 10 and tube 11, the trunnion system 25—30 carries tensile and shear loading transmitted from pipe 10 to member 22 and conversely and the joint is rendered fluid-tight by a flexible bellows 31 connecting flange 23 with flange 24.

In the modification illustrated in Figure 3, the trunnion pin 19 is hollow and retains a slidable plunger 32 having an enlarged head 33 which is caused to bear on the outer edges of the corrugations of the bellows 21 by coil springs 34. The spring-loaded plungers 32 serve by their frictional damping action or by de-tuning the natural frequency of the bellows substantially to suppress resonant oscillations of the bellows.

I claim:

1. For connecting two rigid pipe elements end to end, a flexible joint comprising a fluid tight, flexible bellows connected to each pipe element and an articular structure interconnecting the pipe elements externally of the bellows and composed of rigid elements, hollow hinge pins interconnecting the rigid elements, plungers slidably mounted in the hollow hinge pins and having enlarged heads, and springs retained in the hollow hinge-pins and acting on the plungers to thrust their enlarged heads resiliently against the corrugations of the bellows.

2. For connecting two rigid pipe elements end to end, a flexible joint comprising a fluid tight, flexible bellows connected to each pipe element and an articular structure interconnecting the pipe elements externally of the bellows and comprising rigid elements, hinges connecting said elements and spring-loaded elements associated with said hinges and bearing resiliently on the corrugations of the bellows.

GEOFFREY BERTRAM ROBERT FEILDEN.

REFERENCES CITED

The following references are of record in the file of this patent:

UNITED STATES PATENTS

| Number | Name | Date |
|---|---|---|
| 390,240 | Legat | Oct. 2, 1888 |
| 1,165,449 | Rietz | Dec. 28, 1915 |

FOREIGN PATENTS

| Number | Country | Date |
|---|---|---|
| 238,723 | Switzerland | Aug. 15, 1945 |